(12) United States Patent
Huang et al.

(10) Patent No.: US 10,211,853 B2
(45) Date of Patent: Feb. 19, 2019

(54) METHOD OF TRANSMITTING AND RECEIVING AUDIO SIGNALS AND APPARATUS THEREOF

(71) Applicant: Lattice Semiconductor Corporation, Portland, OR (US)

(72) Inventors: Jiong Huang, Sunnyvale, CA (US); Alexander Peysakhovich, San Jose, CA (US); Lei Ming, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 88 days.

(21) Appl. No.: 15/228,409

(22) Filed: Aug. 4, 2016

(65) Prior Publication Data

US 2017/0054552 A1 Feb. 23, 2017

Related U.S. Application Data

(60) Provisional application No. 62/206,191, filed on Aug. 17, 2015.

(51) Int. Cl.
*H04L 29/06* (2006.01)
*H03M 13/37* (2006.01)
*G06F 13/42* (2006.01)
*H04L 9/06* (2006.01)

(52) U.S. Cl.
CPC .... *H03M 13/3746* (2013.01); *G06F 13/4282* (2013.01); *H04L 9/065* (2013.01); *H04L 2209/20* (2013.01); *H04L 2209/34* (2013.01)

(58) Field of Classification Search
CPC ... G06F 21/31; G06F 21/6218; G06T 1/0028; H04N 7/167; H04H 60/23; H04L 63/0428; H04L 63/164
See application file for complete search history.

(56) References Cited

U.S. PATENT DOCUMENTS

| | | | | |
|---|---|---|---|---|
| 4,964,162 A | * | 10/1990 | McAdam | H04H 60/23 338/20 |
| 6,914,637 B1 | * | 7/2005 | Wolf | H04L 1/0057 348/473 |
| 7,278,085 B1 | * | 10/2007 | Weng | G06F 11/1008 714/766 |

(Continued)

*Primary Examiner* — Ali S Abyaneh
(74) *Attorney, Agent, or Firm* — Haynes and Boone, LLP (57) ABSTRACT

Example embodiments disclosed herein relate to a method of transmitting an audio signal and also a method of receiving an audio signal. The method of transmitting the audio signal includes: receiving the audio signal including a plurality of frames having a left and right subframes containing audio data of a first number of bits; encoding the left and right subframes into a parity code of a second number of bits; generating serial data by combining the parity code and the audio data; and transmitting the serial data over an audio transmission media having a bandwidth of a third number of bits, a sum of the first number of bits and the second number of bits being below the third number of bits. The method of receiving the audio signal includes: receiving a serial signal combining a parity code; decoding the serial signal by calculating a syndrome based on the parity code; detecting an error by comparing the syndrome with the audio data; and generating a corrected audio signal by correcting the detected error.

22 Claims, 4 Drawing Sheets

(56) References Cited

U.S. PATENT DOCUMENTS

| | | | | |
|---|---|---|---|---|
| 2002/0163598 A1* | 11/2002 | Pasqualino | ............ | H03L 7/085 348/725 |
| 2004/0186933 A1* | 9/2004 | Nanki | ................. | H03M 7/04 710/33 |
| 2005/0096765 A1* | 5/2005 | Rao | ..................... | G10L 19/16 700/94 |
| 2006/0269056 A1* | 11/2006 | Montag | ................ | H04N 5/913 380/205 |
| 2011/0160882 A1* | 6/2011 | Gupta | ............... | H04N 21/4131 700/94 |

\* cited by examiner

METHOD OF TRANSMITTING AND RECEIVING AUDIO SIGNALS AND APPARATUS THEREOF

CROSS-REFERENCE TO RELATED APPLICATIONS

This application claims the benefit of the filing date of U.S. provisional application No. 62/206,191, filed on Aug. 7, 2015, which is incorporated herein by reference in its entirety for all purposes.

BACKGROUND

Field

Example embodiments disclosed herein generally relate to audio signal transmitting and receiving, and more specifically, to methods and apparatuses for transmitting and receiving a digital audio signal supplemented with a parity code taking advantage of additional bandwidth of an audio interconnect medium.

Related Art

In many applications such as digital audio transmission between two audio devices, an interconnect cable is used to link the devices, allowing the digital signals passing through. A typical example of the digital audio transmission is the interconnection between a digital source such as a compact disc (CD) transport outputting digital signals and a processor such as a digital-to-analog converter (DAC) receiving the digital signals. In this scenario, various formats can be used to realize such a transmission of the digital signal. One of the most common formats is SPDIF (Sony/Philips Digital Interface Format), which is used in consumer audio equipment to transmit audio signals over relatively short distances.

Such a format has been used since the 1980s, and it specifies some details regarding the transmission where a coaxial cable used as the interconnect cable is preferred to have an impedance of 75 ohms. Connectors of the cable are preferred to be in a form of RCA (Radio Corporation of America) or BNC (Bayonet Neill-Concelman). Optical cables, commonly known as TOSLINK (from Toshiba Link), can be used to carry signals in the SPDIF format as well, which transmits the digital signal over fiber optic medium. Other formats and mediums may be adopted for the digital signal transmission. Because each of the mediums has a particular limit on bandwidth, the total bit number of the digital signals to be transmitted is usually confined.

However, although the digital audio transmission has prevailed for long, no error correction mechanism has been introduced to correct errors introduced in the course of transmission over the link of SPDIF. As a single bit error over the link could consequently deteriorate audio quality for a long period of time, the lack of error correction may cause unwanted data corruption having been overlooked in the industry of digital audio.

SUMMARY

Example embodiments disclosed herein proposes methods of transmitting and receiving an audio signal. Corresponding apparatuses to implement the methods are also provided.

In one aspect, example embodiments disclosed herein provide a method of transmitting an audio signal. The method includes: receiving the audio signal including a plurality of frames, each of the plurality of frames including: a left subframe containing audio data of a first number of bits, and a right subframe containing audio data of the first number of bits; encoding the left and right subframes into a parity code of a second number of bits; generating serial data by combining the parity code and the audio data; and transmitting the serial data over an audio transmission media having a bandwidth of a third number of bits, a sum of the first number of bits and the second number of bits being below the third number of bits.

In another aspect, example embodiments disclosed herein provide a method of receiving an audio signal. The method includes receiving a serial signal combining a parity code of a second number of bits and audio data of a first number of bits over a media having a bandwidth of a third number of bits, the serial signal including a plurality of frames, each of the plurality of frames including a left and a right subframes, a sum of the first number of bits and the second number of bits being below the third number of bits; decoding the serial signal by calculating a syndrome based on the parity code; detecting an error by comparing the syndrome with the audio data; and generating a corrected audio signal by correcting the detected error.

In a further aspect, example embodiments disclosed herein provide a device. The device includes a processing unit; a memory coupled to the processing unit and storing instructions thereon, the instructions, when executed by the processing unit, performing acts including: receiving the audio signal including a plurality of frames, each of the plurality of frames including: a left subframe containing audio data of a first number of bits, and a right subframe containing audio data of the first number of bits; encoding the left and right subframes into a parity code of a second number of bits; generating serial data by combining the parity code and the audio data; and transmitting the serial data over an audio transmission media having a bandwidth of a third number of bits, a sum of the first number of bits and the second number of bits being below the third number of bits.

In a further aspect, example embodiments disclosed herein provide a device. The device includes a processing unit; a memory coupled to the processing unit and storing instructions thereon, the instructions, when executed by the processing unit, performing acts including: receiving a serial signal combining a parity code of a second number of bits and audio data of a first number of bits over a media having a bandwidth of a third number of bits, the serial signal including a plurality of frames, each of the plurality of frames including a left and right sub-frames, a sum of the first number of bits and the second number of bits being below the third number of bits; decoding the serial signal by calculating a syndrome based on the parity code; detecting an error by comparing the syndrome with the audio data; and generating a corrected audio signal by correcting the detected error.

Through the following description, it would be appreciated that potential corruption due to transmission errors can be minimized by using the methods and apparatuses in accordance with the example embodiments disclosed herein. Bandwidth of the interconnect medium unused by the audio transmission is utilized to carry the parity code of the audio signal, so that additional bandwidth to the existing interconnect medium is not necessary. As a result, the resistibility to error is improved for digital audio transmission while the system complexity remains.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DESCRIPTION OF EXAMPLE EMBODIMENTS

Principles of the example embodiments disclosed herein will now be described with reference to various example embodiments illustrated in the drawings. It should be appreciated that the depiction of these embodiments is only to enable those skilled in the art to better understand and further implement the example embodiments disclosed herein, not intended for limiting the scope in any manner.

Figure 1:
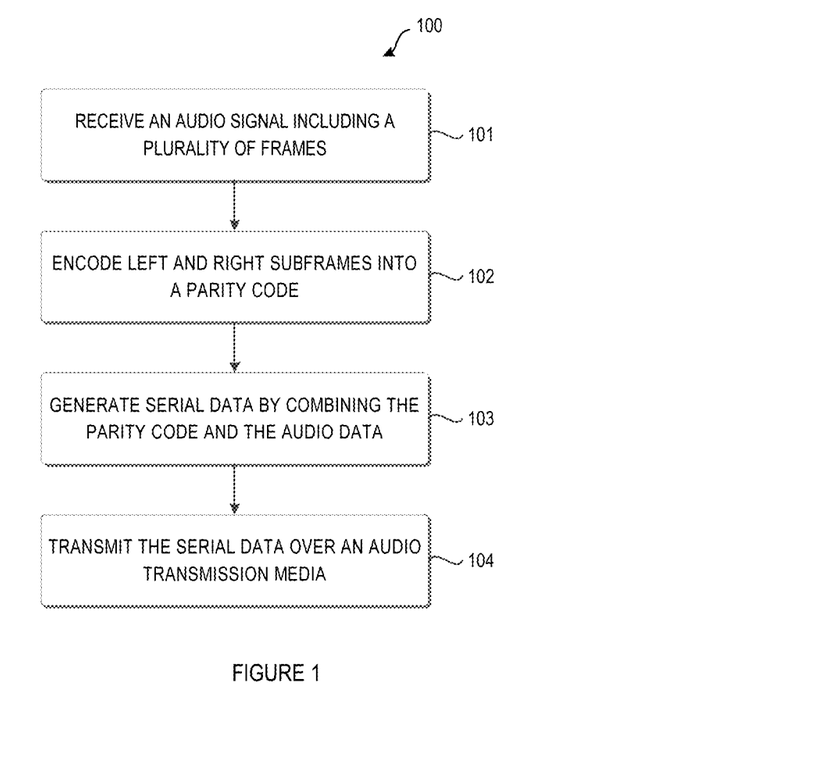
FIG. 1 illustrates a process of transmitting an audio signal in accordance with an example embodiment.

FIG. 1 illustrates a process 100 of transmitting an audio signal in accordance with an example embodiment. In step 101, an audio signal is received which includes a number of frames. For a stereo audio signal, each frame may include a left subframe containing audio data of a first number of bits and a right subframe containing audio data of the first number of bits. In one example embodiment, but not to limit the scope of the present disclosure, the first number of bits for a typical stereo audio signal may be 19, meaning that 19 bits are allocated for each subframes so as to carry useful audio contents as well as other information.

In step 102, the left and right subframes are encoded into a parity code of a second number of bits. The parity code may include a part for the left subframe and another part for the right subframe. The parity code can be generated based on various algorithms for later correction processes. In one example embodiment, the bit length of the parity code for each of the left or right subframe can be 8 bits. Then, in step 103, serial data is generated by combining the parity code and the audio data. In step 104, the serial data is transmitted over an audio transmission media having a bandwidth of a third number of bits. The audio transmission media can be of different types such as the SPDIF format. In case that the SPDIF format is adopted, the bandwidth allowed for each subframe to transmit would be 32 bits in total. A sum of the first number of bits and the second number of bits is below the third number of bits. For stereo audio signals, a compressed audio signal usually occupies a bandwidth smaller than 24 bits, making additional spaces potentially to be utilized given that the bandwidth over SPDIF is 32 bits. Therefore, by using a generated parity code to occupy the "empty" 8 or more bits, the audio signal will be transmitted with improved fidelity.

Figure 2:
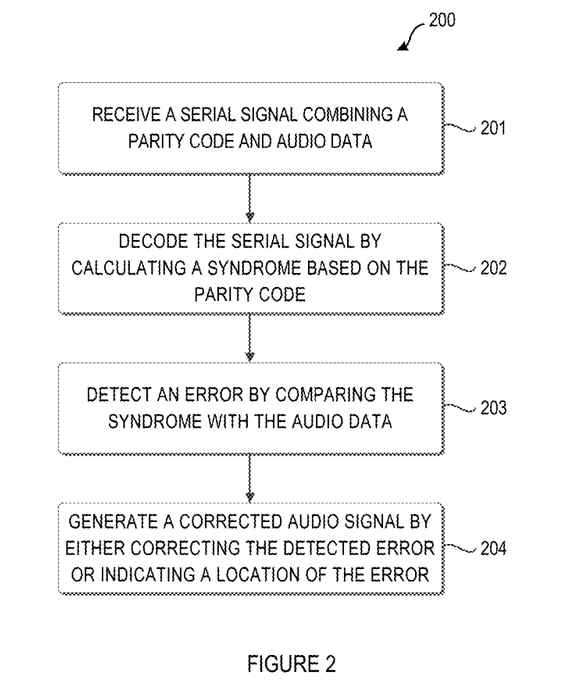
FIG. 2 illustrates a process of receiving an audio signal in accordance with an example embodiment.

FIG. 2 illustrates a process 200 of receiving an audio signal in accordance with an example embodiment. In step 201, a serial signal combining a parity code of a second number of bits and audio data of a first number of bits is received over a media having a bandwidth of a third number of bits. The serial signal includes a number of frames. Each of the plurality of frames includes a left and a right subframes. A sum of the first number of bits and the second number of bits is below the third number of bits. Therefore, in summary, the process 200 is to receive the serial data generated in the process 100 discussed above. In step 202, the serial signal is decoded by calculating a syndrome based on the parity code. This can be done by using a similar algorithm as in the step 102 discussed above. In step 203, an error is detected by comparing the syndrome with the audio data. In step 204, a corrected audio signal is generated by correcting the detected error (which includes indicating a location of the error). If the audio signal compared in the step 203 indicates that there is no error, the audio signal is passed to a later stage for digital processing directly. However, if a single-bit error or even a consecutive 2-bit error (on the basis of an interleaving process, will be described in the following) is included, the step 204 is used to output the corrected audio signal, with improved fidelity.

In the following, an example embodiment is illustrated where digital audio transmissions are carried out between two devices linked by an interconnect cable. The transmission via the interconnect cable shown in this embodiment is in SPDIF format, which usually has a bandwidth limit of 32 bits for each channel. The audio signal to be transmitted is a compressed audio stream having numerous frames of 16 bits for each channel, or "subframe." Additionally, some bits can be used to carry information such as channel, user and validity metadata, each occupying a single bit to intend related information. Therefore, for each subframe of a single frame of the audio signal, 19 bits are occupied to carry audio data as well as other data. In other words, for the bandwidth limit of 32 bits, 13 bits are unoccupied, making it possible to carry additional error correction codes (ECC) or parity codes without expanding the bandwidth limited by the SPDIF format.

It is to be understood that the above configuration is just an example for a person skilled in the art to better comprehend the disclosure, but by no means to limit the scope thereof. For example, audio signals can be uncompressed, which occupies more bits, and the bandwidth limit of the transmission format can be other than SPDIF, allowing more bits of audio contents to be transmitted. In principle, the present disclosure is not to limit the form, capability, and the like of the audio transmission or the audio signal itself, once additional and unoccupied bandwidth for the parity code exists for the transmission.

Figure 3:
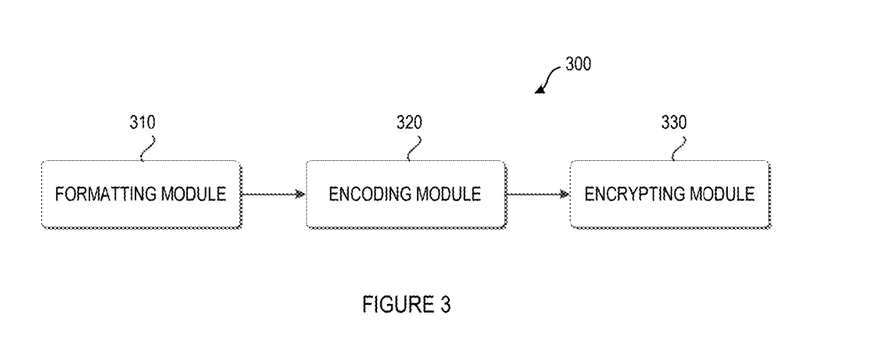
FIG. 3 illustrates an example audio data path on a transmitter in accordance with an example embodiment.

FIG. 3 illustrates an example audio data path on a transmitter 300. In this example, the audio data received at the leftmost end in FIG. 3 is via I²S (also known as Inter-IC Sound, Integrated Interchip Sound, or IIS), which is an electrical serial bus interface standard used for connecting digital audio devices together. Of course, other standard can be used for the input audio data in other examples. A formatting module 310 is used to receive the input audio signals to convert it to a format readable by an encoding module 320. For example, for dealing with the compressed stereo audio signal, the signal processed by the formatting module 310 can be of 19 bits.

The encoding module 320 is mainly used to generate a parity code based on the audio signal output by the formatting module 310. In one example, a particular algorithm known as BCH (the abbreviation comes from the initials of three people who invented the algorithm: Raj Bose, D. K. Ray-Chaudhuri and Alexis Hocquenghem) can be used to calculate a parity code of 8 bits. The algorithm will be discussed in later paragraphs. The encoding module 320 is followed by an encryption module 330, which is used to carry out an HDCP (high definition copy protocol) masking process, for example, before the audio data is transmitted via an interconnect cable.

Figure 4:
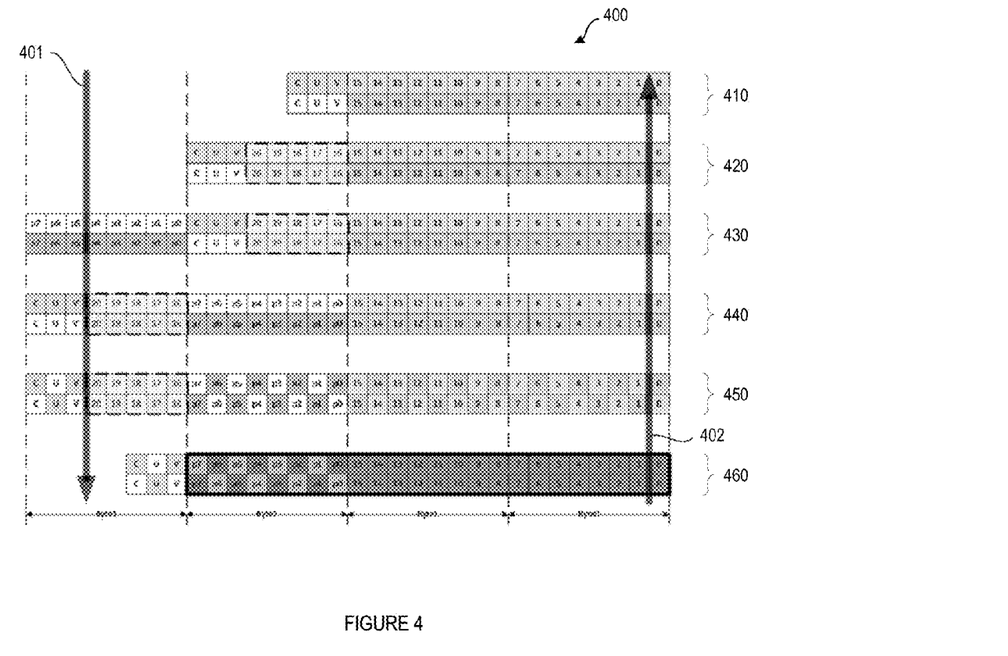
FIG. 4 illustrates a breakdown diagram showing the composition of the audio signals for one frame at each step realized by an encoding module in accordance with an example embodiment.

FIG. 4 illustrates a breakdown diagram showing the composition of the audio signals for one frame at each step realized by the encoding module 320. In this embodiment, stages 410 to 460 are shown in an order shown in FIG. 4 (an arrow 401 pointing downwards). At the stage 410, the composition of an audio signal contains data of 19 bits, which can be directly output by the formatting module 310. The composition is formed by two rows of data, each representing one of left and right channels for stereo audio signals. Each row shown in the audio signal can be called as a subframe. In this example, compressed audio contents are illustrated to occupy 16 bits for each subframe, taking up "Byte 0" and "Byte 1" in FIG. 4. Three additional bits are occupied in "Byte 2" for carrying information other than the audio data. "C" denotes channel information, "U" denotes user information, and "V" denotes validity information.

At the stage 420, the audio data needs to be formatted to 24 bits for each subframe so that the audio data can be used by an algorithm known as BCH (32, 24) to calculate the parity code. To achieve this, 5-bit padding can be generated to stuff each subframe from bit "16" to bit "20." Specifically, "Byte 2" at 420 is stuffed with the generated padding data, with each bit assigned with a value "0." After this step, the audio data occupies 24 bits, or 3 bytes.

At the stage 430, the stuffed audio data is used by the algorithm BCH (32, 24) for obtaining the parity code to be occupied by "Byte 3" (for each subframe). The BCH (32, 24) is an example error correcting algorithm used to generate a parity code of 8 bits based on a 24-bit data. The algorithm relies on a polynomial for the calculation in a number of repetitions until the parity code is obtained. The bracketed number "32" represents the total code length, while the number "24" represents the original code length. Due to the parity code generated, the algorithm BCH (32, 24) is able to correct single bit errors and detect multi-bit errors. Because the BCH algorithm is already well known, detailed explanations thereof will not be illustrated in the context. Although BCH (32, 24) is used as an example embodiment, it is to be understood that other algorithms are also potentially usable for generating the parity code of any desired bits.

At the stage 440, the generated parity code of 8 bits are swapped with the additional information such as "C," "U" and "V" bits and the stuffed zero bits generated at the stage 420. In this manner, the bits for each subframe are re-arranged, making "Byte 0," "Byte 1" and "Byte 2" including information to be dealt with by an HDCP encryption process, for example. It is to be understood that the stage 440 can be different, and the re-arrangement may be adjusted in accordance with the subsequent process when needed.

At the stage 450, the 32-bit left subframe is bitwise interleaved with the 32-bit right subframe. In other words, the data on one of the subframes is swapped with the data on the other of the subframe for every other bit. As a result, the ECC capability can be maximized when a burst error occurs during the data transmission. Because of the interleaving stage 450, the ECC process is able to correct two adjacent bits which are both corrupted. In case that the interleaving process is absent and two adjacent corrupted bits are present, the corrupted bit(s) can only be detected but not to be corrected. However, the interleaving stage 450 is not necessarily included in the whole process. Furthermore, it is to be understood that the stage 450 can be swapped with the re-arranging stage 440, meaning that the re-arrangement of the bits in the subframe and the interleaving process are interchangeable.

At the stage 460, the 5-bit padding for each subframe is removed, reducing the bit number from 32 to 27. An encrypting module 330 shown in FIG. 3 can be used to carry out an encryption process such as a 24-bit HDCP masking process for the data obtained after the stage 460. The HDCP mask can be applied to "Byte 0," "Byte 1" and "Byte 2," with the bits "C," "U" and "V" not subjected to the HDCP encryption process. Because the HDCP encryption process is already well known, detailed explanations thereof will not be illustrated in the context.

Figure 5:
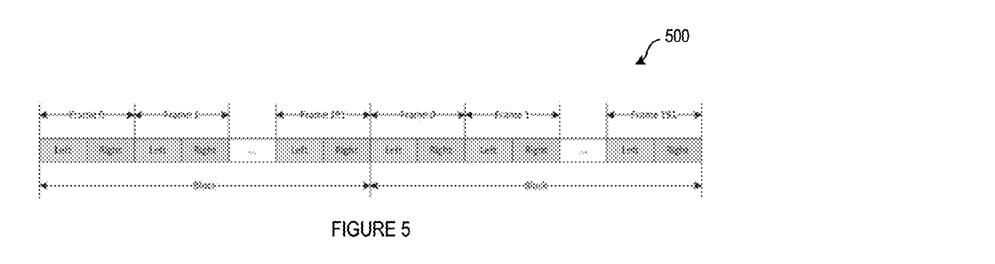
FIG. 5 illustrates a serial audio stream protected by an ECC encryption in accordance with an example embodiment.

After the encryption process carried out in the encrypting module 330, the audio data is to be transmitted over SPDIF. A serial audio stream 500 protected by the ECC encryption is illustrated in FIG. 5. The example serial audio stream 500 includes a number of blocks 510. In this example, each block may contain 192 frames. Each of the frames 510 may contain two subframes 511, 512 for stereo audio data, whose compositions will be explained in the following.

Figure 6:
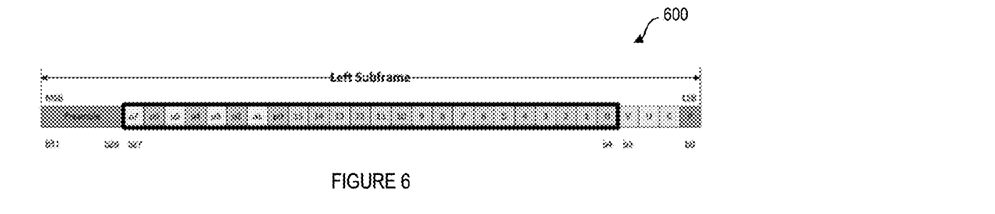
FIG. 6 illustrate the bit mappings of a left subframe being transmitted over SPDIF in accordance with an example embodiment.
Figure 7:
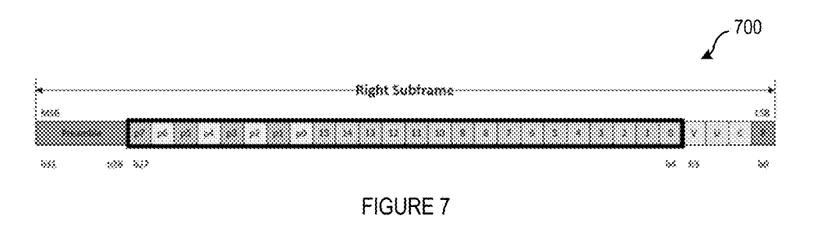
FIG. 7 illustrate the bit mappings of a right subframe being transmitted over SPDIF in accordance with an example embodiment.

FIGS. 6 and 7 illustrate the bit mappings of the left and right subframes 600, 700 being transmitted over SPDIF. Due to the interleaving process, the bits of the left and right subframes 600, 700 are mixed. The 16-bit original audio data in addition to the generated parity code of 8 bits are grouped together, where the data occupying the $5^{th}$ bit ("b4") to the $20^{th}$ bit is the original compressed audio data, and the data occupying the $21^{st}$ bit to the $28^{th}$ bit ("b27") is the parity code. The first bit can be preserved for even parity at link layer. The second to the fourth bit can be used to contain "C," "U" and "V" information, respectively. The $29^{th}$ bit ("b28") to the $32^{nd}$ bit ("b31") are used for preamble information which further indicates left and right subframes 600, 700 and the start of the audio block.

Figure 8:
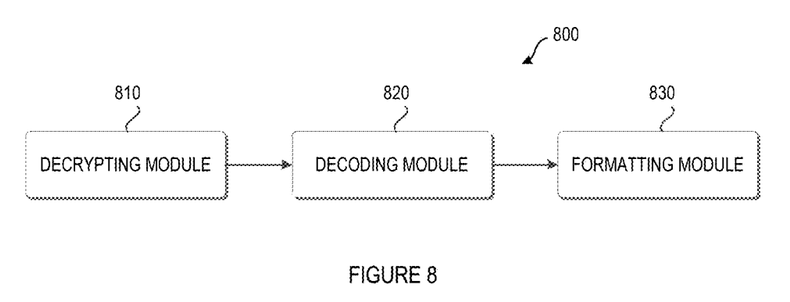
FIG. 8 illustrates an example audio data path on a receiver in accordance with an example embodiment.

FIG. 8 illustrates an example audio data path on a receiver 800. In this example, the audio signal received at the leftmost end in FIG. 8 is the transmitted signal over SPDIF. In this example, the audio signal received is an HDCP encrypted serial signal by the encrypting module 330 shown in FIG. 3. Therefore, a decrypting module 810 can be used to convert the received data to a format shown at the bottom of FIG. 4 at the stage 460. In other words, the converted data contains both the parity code of 8 bits and the audio data of 16 bits, in addition to a few more bits regarding other information.

A decoding module 820 can be used to calculate a syndrome based on the parity code, and detect whether the received audio data is corrupted (namely, containing an error) by comparing the calculated syndrome with the received audio data of 16 bits. If no error occurs, the calculated syndrome well matches with the audio signal based on a selected polynomial such as the one from the BCH (32, 24) in accordance with the example embodiment discussed above. In case that a single bit error exists, the calculated syndrome is used to indicate the location of the error and make correction accordingly. After the correction, a corrected audio signal is generated. In case that the interleaving step is incorporated when encoding the audio signal, the correction process is able to correct two consecutive bit errors because of the interleaving process. Of course, such a signal needs to be deinterleaved at some time during the decoding process. In other words, a single bit error can be corrected without an interleaving process involved, while two consecutive bit errors can be corrected with an interleaving process involved. If three or more consecutive bit errors occur, such errors are usually uncorrectable. However, the calculated syndrome can be used to detect or report the existence of the errors, and the user may be conscious of the error.

In one example, the decoding module 820 is able to detect if data for a particular bit is corrupted. The detection can be done by firstly calculating syndromes based on received parity code, and then the calculated syndromes matches with the received audio if there is no error contained in that frame. If a single bit error or two consecutive bit errors (when the interleaving process is involved) are detected, the calculated syndrome indicates the location of the error (corrupted bit) and the decoding module 820 makes a correction accordingly. In general, the decoding process conducted by the decoding module 820 can be in a reversed order (an arrow 402 pointing upwards shown in FIG. 4) compared with the steps shown in FIG. 4.

After the decoding process, the audio signal may have a similar composition for each frame as the one at the stage 410 of FIG. 4. A formatting module 830 is then provided to convert the audio data after removing the parity code to other format (for example, I²S) that can be processed by subsequent devices or processors. The correction process by the decoding module 820 is able to remove most of the bit errors incurred during the transmission over SPDIF for example. Therefore, the audio data after the formatting process in accordance with the example embodiment has improved fidelity compared with the one involving no correction code at all.

Because the limitation on bandwidth for the SPDIF transmission, the available bandwidth for a stereo audio signal is smaller than 16 bits. It is to be understood that, although the parity code of 8 bits is used in the example embodiments of the present disclosure, parity codes with different bit numbers are also possible.

Figure 9:
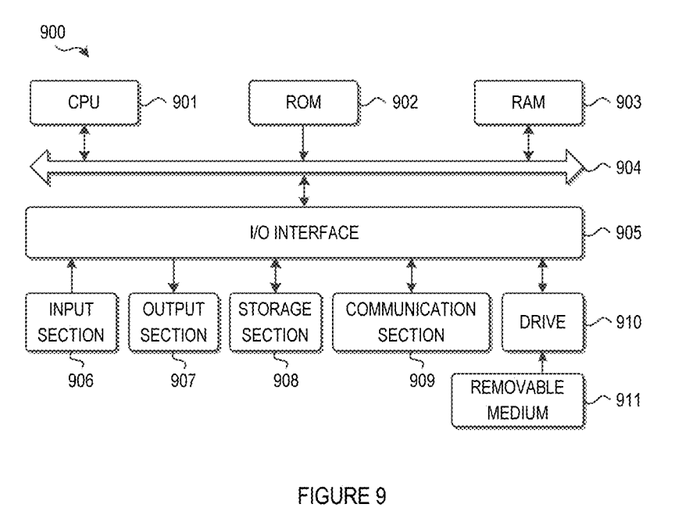
FIG. 9 shows a block diagram of an example computer system suitable for implementing example embodiments disclosed herein.

FIG. 9 shows a block diagram of an example computer system 900 suitable for implementing example embodiments disclosed herein. As shown, the computer system 900 comprises a central processing unit (CPU) 901 which is capable of performing various processes in accordance with a program recorded in a read only memory (ROM) 902 or a program loaded from a storage section 908 to a random access memory (RAM) 903. In the RAM 903, data required when the CPU 901 performs the various processes or the like is also stored as required. The CPU 901, the ROM 902 and the RAM 903 are connected to one another via a bus 904. An input/output (I/O) interface 905 is also connected to the bus 904.

The following components are connected to the I/O interface 905: an input section 906 including a keyboard, a mouse, or the like; an output section 907 including a display, such as a cathode ray tube (CRT), a liquid crystal display (LCD), or the like, and a speaker or the like; the storage section 908 including a hard disk or the like; and a communication section 909 including a network interface card such as a LAN card, a modem, or the like. The communication section 909 performs a communication process via the network such as the internet. A drive 910 is also connected to the I/O interface 905 as required. A removable medium 911, such as a magnetic disk, an optical disk, a magneto-optical disk, a semiconductor memory, or the like, is mounted on the drive 910 as required, so that a computer program read therefrom is installed into the storage section 508 as required.

Specifically, in accordance with the example embodiments disclosed herein, the processes described above with reference to FIGS. 1-8 may be implemented as computer software programs. For example, example embodiments disclosed herein comprise a computer program product including a computer program tangibly embodied on a machine readable medium, the computer program including program code for performing methods 100 and 200. In such embodiments, the computer program may be downloaded and mounted from the network via the communication section 909, and/or installed from the removable medium 911.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed among one or more remote computers or servers.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications, adaptations to the foregoing example embodiments of this disclosure may become apparent to those skilled in the relevant arts in view of the foregoing description, when read in conjunction with the accompanying drawings. Any and all modifications will still fall within the scope of the non-limiting and example embodiments of this disclosure. Furthermore, other example embodiments set forth herein will come to mind of one skilled in the art to which these embodiments pertain to having the benefit of the teachings presented in the foregoing descriptions and the drawings.

What is claimed is:

1. A method, comprising:
receiving an audio signal including a plurality of frames, each of the plurality of frames including:
a left subframe containing first audio data having a first number of bits, and
a right subframe containing second audio data having a first number of bits;
for each of the plurality of frames:
encoding the left and right subframes of the frame to obtain a first parity code associated with the left subframe and a second parity code associated with the right subframe, wherein each of the first parity code and the second parity code have a second number of bits;
generating first serial data associated with the left subframe by combining the first parity code and the first audio data;
generating second serial data associated with the right subframe by combining the second parity code and the second audio data;
interleaving the first serial data with the second serial data to generate at least a third serial data; and
transmitting the third serial data over an audio transmission media having a bandwidth of a third number of bits, wherein a sum of the first number of bits of the first audio data and the second number of bits of the first parity code is less than the third number of bits, and wherein the audio transmission media is of a Sony/Philips Digital Interface Format (SPDIF) format.

2. The method according to claim 1, wherein the sum is smaller than the third number of bits by less than 8 bits.

3. The method according to claim 1, further comprising:
prior to the transmitting the third serial data, encrypting the third serial data by a high definition copy protocol (HDCP) mask.

4. The method according to claim 1, wherein the third number of bits is 32 bits.

5. The method according to claim 4, further comprising:
formatting the first audio data to obtain a first formatted audio data having 24 bits; and
formatting the second audio data to obtain a second formatted audio data having 24 bits,
wherein the first number of bits of the first audio data is smaller than 24 bits.

6. The method according to claim 5, wherein the encoding comprises:
encoding the first formatted audio data to obtain the first parity code of 8 bits by a Bose-Chaudhuri-Hocquenghem (BCH) algorithm; and
encoding the second formatted audio data to obtain the second parity code of 8 bits by the BCH algorithm.

7. The method of claim 1, wherein:
the interleaving comprises interleaving the first serial data with the second serial data to generate the third serial data and a fourth serial data,
the third serial data comprises a first subset of bits of the first serial data and a first subset of bits of the second serial data,
the fourth serial data comprises a second subset of bits of the first serial data and a second subset of bits of the second serial data, and
a sum of a number of bits of the third serial data and a number of bits of the fourth serial data is greater than the third number of bits.

8. A method of receiving an audio signal, the method comprising:
receiving a serial signal over a media, wherein the serial signal comprises a plurality of frames, wherein each of the plurality of frames comprises:
a first subframe comprising first audio data having a first number of bits and first parity code having a second number of bits, wherein the first audio data comprises first left audio data interleaved with first right audio data; and
a second subframe comprising second audio data having a first number of bits and second parity code having a second number of bits, wherein the second audio data comprises second left audio data interleaved with second right audio data; and for each of the plurality of frames:
  decoding the frame, wherein the decoding comprises:
    deinterleaving the first left audio data, the first right audio data, the second left audio data, and the second right audio data;
    calculating at least one syndrome based on the first parity code and the second parity code;
    detecting at least one error based on the at least one syndrome; and
    generating a corrected audio signal by correcting the at least one detected error,
  wherein:
    the media is of a Sony/Philips Digital Interface Format (SPDIF) format,
    the media has a bandwidth of a third number of bits, and
    a sum of the first number of bits of the first audio data and the second number of bits of the first parity code is less than the third number of bits.

9. The method according to claim 8, wherein the sum is smaller than the third number of bits by less than 8 bits.

10. The method according to claim 8, further comprising:
  prior to the decoding the serial signal, decrypting the serial signal by a high definition copy protocol (HDCP) mask.

11. The method according to claim 8, wherein the third number of bits is 32 bits.

12. A device comprising:
  a processing unit;
  a memory coupled to the processing unit and storing instructions thereon, the instructions, when executed by the processing unit, performing acts including:
    receiving an audio signal including a plurality of frames, each of the plurality of frames including:
      a left subframe containing first audio data having a first number of bits, and
      a right subframe containing second audio data having a first number of bits;
    for each of the plurality of frames:
      encoding the left and right subframes of the frame to obtain a first parity code associated with the left subframe and a second parity code associated with the right subframe, wherein each of the first parity code and the second parity code have a second number of bits;
      generating first serial data associated with the left subframe by combining the first parity code and the first audio data;
      generating second serial data associated with the right subframe by combining the second parity code and the second audio data;
      interleaving the first serial data with the second serial data to generate at least a third serial data; and
      transmitting the third serial data over an audio transmission media having a bandwidth of a third number of bits, wherein a sum of the first number of bits of the first audio data and the second number of bits of the first parity code is less than the third number of bits, and wherein the audio transmission media is of a Sony/Philips Digital Interface Format (SPDIF) format.

13. The device according to claim 12, wherein the sum is smaller than the third number of bits by less than 8 bits.

14. The device according to claim 12, wherein the acts further comprise:
  prior to the transmitting the third serial data, encrypting the third serial data by a high definition copy protocol (HDCP) mask.

15. The device according to claim 12, wherein the third number of bits is 32 bits.

16. The device according to claim 15, wherein the acts further comprise:
  formatting the first audio data to obtain a first formatted audio data having 24 bits; and
  formatting the second audio data to obtain a second formatted audio data having 24 bits,
  wherein the first number of bits of the first audio data is smaller than 24 bits.

17. The device according to claim 16, wherein the encoding comprises:
  encoding the first formatted audio data to obtain the first parity code of 8 bits by a Bose-Chaudhuri-Hocquenghem (BCH) algorithm; and
  encoding the second formatted audio data to obtain the second parity code of 8 bits by the BCH algorithm.

18. The device of claim 12, wherein:
  the interleaving comprises interleaving the first serial data with the second serial data to generate the third serial data and a fourth serial data,
  the third serial data comprises a first subset of bits of the first serial data and a first subset of bits of the second serial data,
  the fourth serial data comprises a second subset of bits of the first serial data and a second subset of bits of the second serial data, and
  a sum of a number of bits of the third serial data and a number of bits of the fourth serial data is greater than the third number of bits.

19. A device comprising:
  a processing unit;
  a memory coupled to the processing unit and storing instructions thereon, the instructions, when executed by the processing unit, performing acts including:
    receiving a serial signal over a media, wherein the serial signal comprises a plurality of frames, wherein each of the plurality of frames comprises:
      a first subframe comprising first audio data having a first number of bits and first parity code having a second number of bits, wherein the first audio data comprises first left audio data interleaved with first right audio data; and
      a second subframe comprising second audio data having a first number of bits and second parity code having a second number of bits, wherein the second audio data comprises second left audio data interleaved with second right audio data; and
    for each of the plurality of frames:
      decoding the frame, wherein the decoding comprises:
        deinterleaving the first left audio data, the first right audio data, the second left audio data, and the second right audio data; and
        calculating at least one syndrome based on the first parity code and the second parity code;
      detecting at least one error based on the at least one syndrome; and
      generating a corrected audio signal by correcting the at least one detected error,
    wherein:
      the media is of a Sony/Philips Digital Interface Format (SPDIF) format, the media has a bandwidth of a third number of bits, and a sum of the first number of bits of the first audio data and the second number of bits of the first parity code is less than the third number of bits.

20. The device according to claim 19, wherein the sum is smaller than the third number of bits by less than 8 bits.

21. The device according to claim 19, wherein the acts further comprise:

prior to the decoding the serial signal, decrypting the serial signal by a high definition copy protocol (HDCP) mask.

22. The device according to claim 19, wherein the third number of bits is 32 bits.

* * * * *